(12) United States Patent
Thomson et al.

(10) Patent No.: US 11,061,302 B2
(45) Date of Patent: Jul. 13, 2021

(54) QUICK RELEASE CAMERA MOUNT

(71) Applicant: SYRP LIMITED, Auckland (NZ)

(72) Inventors: Christopher Thomson, Auckland (NZ); Samuel Blok, Auckland (NZ); James Allen, Auckland (NZ)

(73) Assignee: SYRP LIMITED, Auckland (NZ)

( * ) Notice: Subject to any disclaimer, the term of this patent is extended or adjusted under 35 U.S.C. 154(b) by 0 days.

(21) Appl. No.: 16/606,838

(22) PCT Filed: Apr. 23, 2018

(86) PCT No.: PCT/IB2018/052793
§ 371 (c)(1),
(2) Date: Oct. 21, 2019

(87) PCT Pub. No.: WO2018/193430
PCT Pub. Date: Oct. 25, 2018

(65) Prior Publication Data
US 2020/0050086 A1    Feb. 13, 2020

(30) Foreign Application Priority Data
Apr. 21, 2017    (NZ) ........................................ 731244

(51) Int. Cl.
*G03B 17/56* (2021.01)
*F16M 11/04* (2006.01)
*F16M 13/02* (2006.01)

(52) U.S. Cl.
CPC ......... *G03B 17/561* (2013.01); *F16M 11/041* (2013.01); *F16M 13/02* (2013.01); *F16M 2200/02* (2013.01)

(58) Field of Classification Search
CPC .................................................. G03B 17/566
See application file for complete search history.

(56) References Cited

U.S. PATENT DOCUMENTS

| 4,466,595 A | 8/1984 | O'Connor |
| 5,429,332 A * | 7/1995 | Ishikawa .............. F16M 11/041 |
| | | 248/187.1 |

(Continued)

FOREIGN PATENT DOCUMENTS

| CN | 1912731 A * | 2/2007 | ............. F16M 13/00 |
| CN | 1912731 A | 2/2007 | |

(Continued)

OTHER PUBLICATIONS

China National Intellectual Property Administration Search Report dated Oct. 23, 2020, issued in related Chinese Patent Application No. 2018800260096.

*Primary Examiner* — Clayton E. LaBalle
*Assistant Examiner* — Leon W Rhodes, Jr.
(74) *Attorney, Agent, or Firm* — Volpe Koenig

(57) ABSTRACT

A quick release mount system having a mounting plate with opposed sides, each includes latching surfaces, adapted to be received into a base member having a socket. The mounting system further includes at least one movable latching member for engaging with the latching surface of the mounting plate to prevent separation of the mounting plate from the socket. The mounting system also includes a locking mechanism for clamping said mounting plate within the socket, by pushing the mounting plate in a direction perpendicular to the base, and against the at least one latching member.

16 Claims, 13 Drawing Sheets

(56) References Cited

U.S. PATENT DOCUMENTS

| | | | |
|---|---|---|---|
| 7,185,862 B1 * | 3/2007 | Yang | F16M 11/041 248/187.1 |
| 7,290,740 B2 * | 11/2007 | Joy | B60R 11/00 248/187.1 |
| 7,642,741 B2 * | 1/2010 | Sidman | G03B 17/561 318/649 |
| 7,828,256 B2 * | 11/2010 | Speggiorin | F16M 11/041 248/187.1 |
| 9,303,940 B2 | 4/2016 | Bonelli et al. | |
| 9,372,383 B2 * | 6/2016 | Johnson, Sr. | F16M 11/14 |
| 2013/0256484 A1 | 10/2013 | Kessler et al. | |
| 2017/0314726 A1 * | 11/2017 | Johnson, Sr. | G03B 17/561 |

FOREIGN PATENT DOCUMENTS

| | | | | |
|---|---|---|---|---|
| CN | 203731041 U | 7/2014 | | |
| CN | 104854420 A | 8/2015 | | |
| EP | 1160499 A1 | 12/2001 | | |
| EP | 2708791 A2 * | 3/2014 | | F16M 11/041 |
| EP | 2708791 A2 | 3/2014 | | |

\* cited by examiner

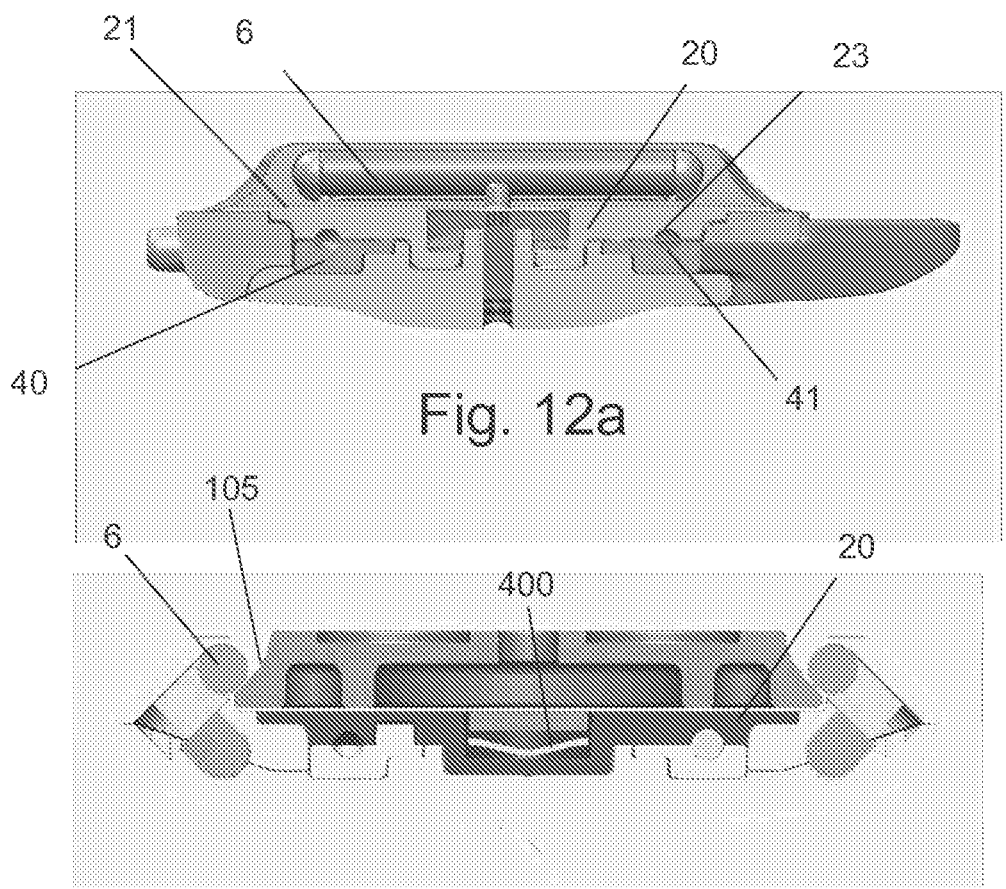
Fig. 12a
Fig. 12b
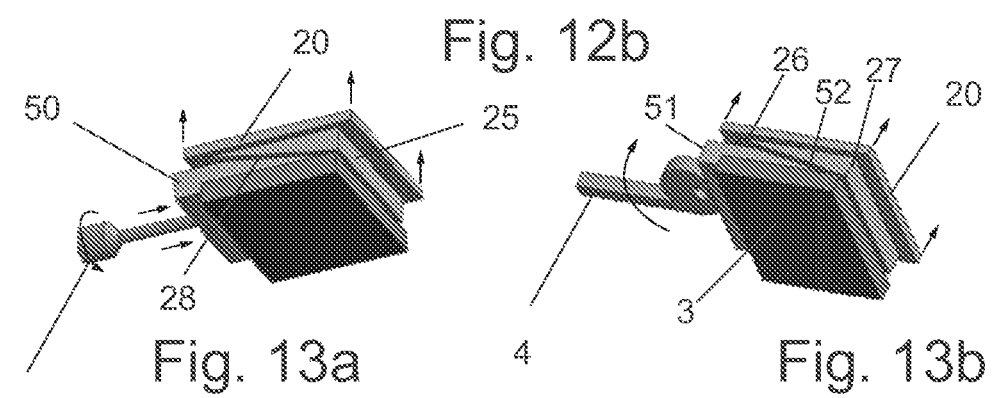
Fig. 13a
Fig. 13b
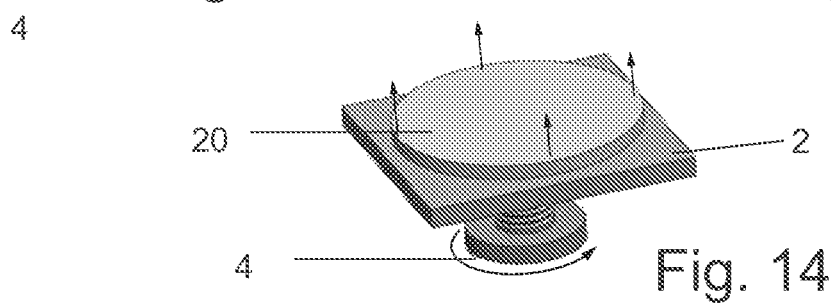
Fig. 14

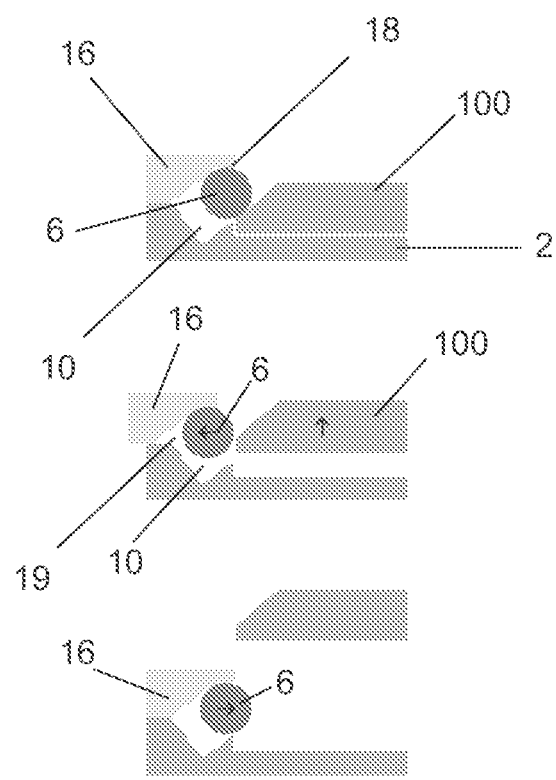
Fig. 15a
Fig. 15b
Fig. 15c
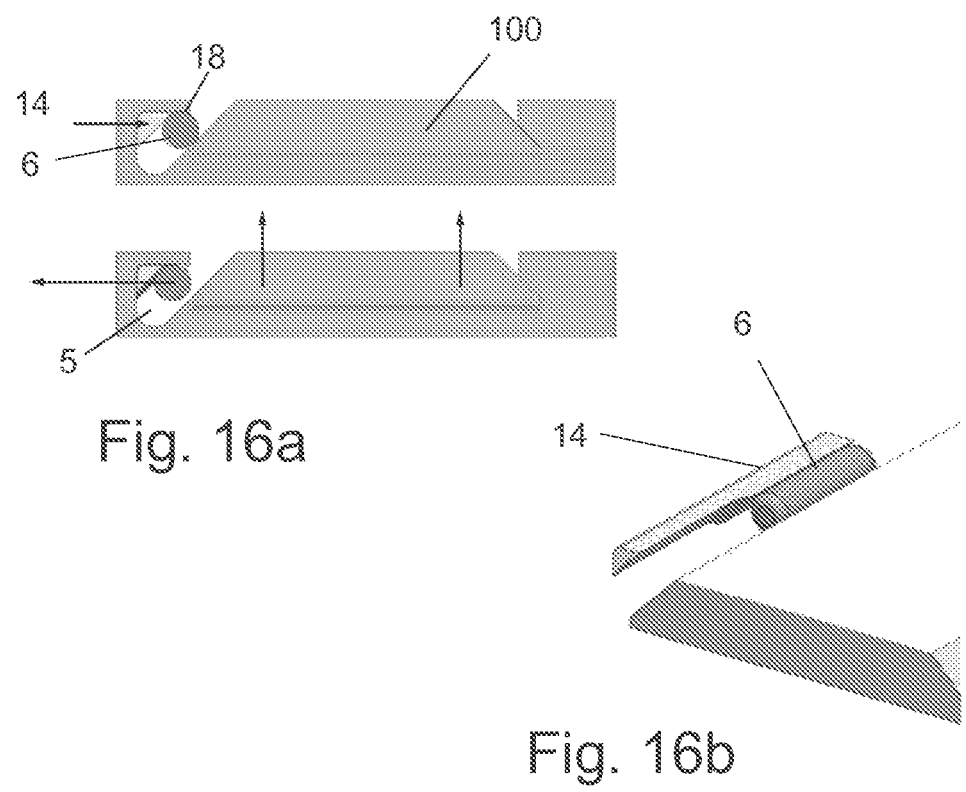
Fig. 16a
Fig. 16b

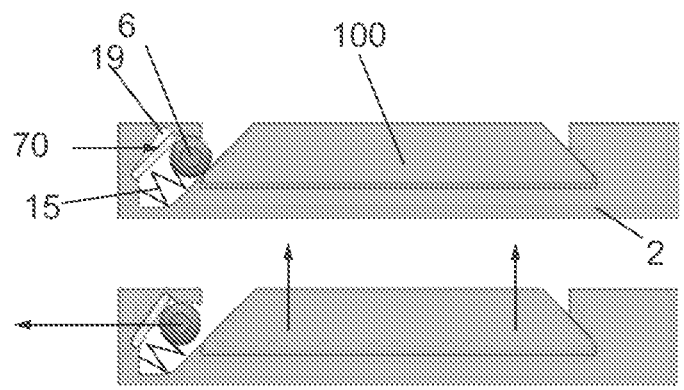
Fig. 17a
Fig. 17b
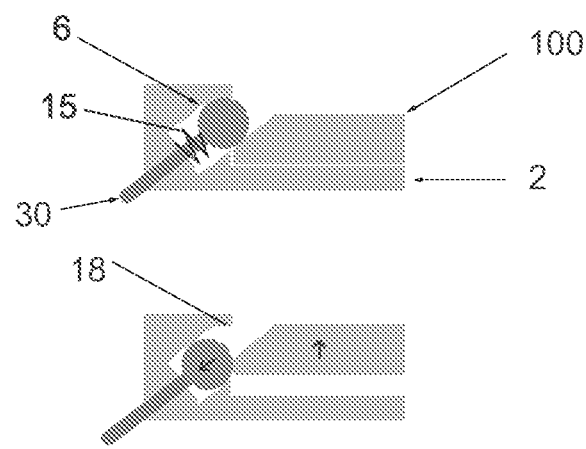
Fig. 18a
Fig. 18b
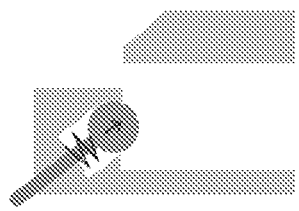
Fig. 18c

QUICK RELEASE CAMERA MOUNT

FIELD OF THE INVENTION

The present invention relates to camera mounts. More particularly, but not exclusively, it relates to quick release camera mounts.

BACKGROUND OF THE INVENTION

The invention relates to particularly quick release camera mounts for locking and releasing a camera plate. However, other uses will readily present themselves.

Cameras and other optical devices may be attached to stands, tripods, and other objects. Typically a camera may be attached to a camera plate, the camera plate may then be attached to a camera mount, and the camera mount may be attached to a desired object to be supported.

Cameras and camera accessories may be expensive, and users often desire a stable mount to secure their cameras.

Some camera mounts operate in a latched mode, locked mode, and a release mode which may improve the user friendliness of the camera mount.

In a latched mode, camera mounts allow a limited range of camera plate movement.

In a locked mode, a locking mechanism rigidly locks the camera plate in the camera mount to secure and prevent any movement of the camera plate.

In the release mode a releasing mechanism such as a button, frees the camera plate so that it can be removed from the camera mount.

However some camera mounts are not particularly intuitive and/or easy to use. Other camera mounts have limited stability, especially for larger optical devices.

Further, ease of securing a camera or other optical device to a camera mount is desired. Camera mounts which are more stable may also be desired.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

It is an object of the present invention to provide a quick release mount which overcomes or at least partially ameliorates at least one of the abovementioned disadvantages, or which at least provides the public with a useful choice.

BRIEF DESCRIPTION OF THE INVENTION

In a first aspect the invention broadly comprises a quick release mount system comprising:
a mounting plate having opposed sides, each including latching surfaces, a base having a socket for receiving said mounting plate, and at least one movable latching member for engaging with a said latching surface of said mounting plate to prevent separation of said mounting plate from said socket, and wherein said mounting system further comprises a locking mechanism for clamping said mounting plate within said socket, said locking mechanism operating to push said mounting plate in a direction perpendicular to said base against said at least one latching member.

According to another aspect said base having a socket for receiving said mounting plate includes at least one movable latching member for engaging with each latching surface on opposed sides of said mounting plate.

According to another aspect there are a plurality of movable latching members for engaging with said latching surface.

According to another aspect said movable latching members are each located within a slot in a sidewall of said base, and are constrained to move only along a path with a single degree of translational freedom.

According to another aspect said path is oriented obliquely with respect to a floor of said socket.

According to another aspect said path is oriented obliquely with respect to their floor at:
a) between approximately 30° and approximately 60°, or
b) approximately 45°.

According to another aspect said latching members are:
a) ball bearings,
b) substantially cylindrical rollers, or
c) a combination of ball bearings and cylindrical rollers.

According to another aspect said latching members are free to rotate.

According to another aspect said latching members are biased into a latching position, such that said latching members protrude at least partially into said socket.

According to another aspect said opposed sides of said mounting plate include oblique latching surfaces such that a base of said mounting plate is wider than a top of said mounting plate.

According to another aspect a release mechanism is provided for disengaging at least all the latching members along one side of said socket, from said latching surfaces of said mounting plate.

According to another aspect said release mechanism translates said latching members in a straight linear path.

According to another aspect said locking mechanism comprises:
  a locking plate located in a floor of said socket, and including on an underside thereof a plurality of locking plate ball tracks defining a helical path,
  a locking ring located under said locking plate, and including on an upper side thereof a plurality of locking ring ball tracks defining helical paths to complement said locking plate ball tracks, and
  a plurality of ball bearings, each located within corresponding locking plate and locking ring ball tracks, and
  wherein rotation of said locking ring with respect to said locking plate causes the ball bearings to separate the locking ring from the locking plate to thereby clamp said mounting plate between said locking plate and said latching members.

According to another aspect there are between 3 and 6 corresponding sets of ball bearings and ball tracks.

According to another aspect said locking mechanism comprises complimentary wedged members configured to translate with respect to each other, and thereby clamp said mounting plate between said locking plate and said latching members.

According to another aspect said locking mechanism comprises at least one threaded member, the rotation of which clamps said mounting plate between said locking plate and said latching members.

According to another aspect, said invention broadly comprises a quick release mounting system that receives a mounting plate supported on a base, and prevented from release by at least one movable latching member engaging a latching surface of said mounting plate, wherein said mount further operates a locking mode by clamping said camera plate against at least one latching member by urging said camera plate away from said base.

According to another aspect, said invention broadly comprises a quick release mounting system that receives a mounting plate supported on a base defining a socket, and includes at least one latching member that in a latching condition:
 a) engages a latching surface of said mounting plate, and
 b) is constrained for translation along a single first direction only, and wherein
  said at least one latching member when in an unlatching condition, is not constrained to translate only along said first direction.

According to another aspect there are a plurality of movable latching members for engaging with said latching surface.

According to another aspect when said latching members are in said unlatching condition, they can translate along at least an additional direction having at least a component orthogonal to said first direction, and/or away from said latching surface of said mounting plate.

According to another aspect when in said latching condition, said latching members prevent removal of said mounting plate from said base, and when in said unlatching condition, said latching members allow removal of said mounting plate from said base.

According to another aspect said latching members are biased into said latching condition.

According to another aspect said movable latching members are each located within a slot in a sidewall of said base, and when in said latching condition are constrained to move only along a path with a single degree of translational freedom by sidewalls of said slots.

According to another aspect said path is oriented obliquely with respect to a plane of said mounting plate.

According to another aspect said path is oriented obliquely with respect to said plane:
 a) between approximately 30° and approximately 60°, or
 b) approximately 45°.

According to another aspect the invention broadly comprises a quick release mounting system according to the previous clauses, wherein said latching members are:
 a) ball bearings,
 b) substantially cylindrical rollers, or
 c) a combination of ball bearings and cylindrical rollers.

According to another aspect said latching members are free to rotate.

According to another aspect said latching members are biased into a latching position, such that said latching members protrude at least partially into said socket.

According to another aspect said opposed sides of said mounting plate include oblique latching surfaces such that a base of said mounting plate is wider than a higher portion.

According to another aspect said latching members are constrained for translation along said single first direction only, by a movable latching actuator when said latching actuator is in a latching position.

According to another aspect said latching members are no longer constrained for translation along said single first direction when said latching actuator is in an unlatching position.

According to another aspect said latching actuator is biased into said latching position.

According to another aspect said mounting plate is generally circular, and defines a projecting lip around at least portions of its periphery, said lid defining said latching surfaces.

According to another aspect when in said latching condition, said mounting plate is free to rotate with respect to said base.

According to another aspect said latching actuator is a rotatable ring in circling said latching members, and
 wherein said latching actuator defines a series of latching cam surfaces and unlatching cavities, spaced around an inner edge such that:
 a) when said latching actuator is in a latching position, said latching cam surfaces engage a respective said latching member to constrain said latching member for translation along said single first direction, and
 b) when said latching actuator is in an unlatching position, said unlatching cavities are positioned adjacent said respective latching members such that said latching members are no longer constrained for translation only along said single first direction.

According to another aspect when said latching actuator is in and unlatched position, said latching members are able to move radially outwards and disengage from said latching surfaces of said mounting plate.

According to another aspect said latching actuator is a translating member located behind a respective said latching member, and
 wherein said latching actuator defines a latching cam surface and an unlatching cavity, such that:
 c) when said latching actuator is in a latching position, said latching cam surface engages a respective said latching member to constrain said latching member for translation along said single first direction, and
 d) when said latching actuator is in an unlatching position, said unlatching cavity is positioned adjacent said respective latching member such that said latching member is no longer constrained for translation only along said single first direction.

According to another aspect said mount further operates a locking mode by clamping said camera plate against at least one latching member by urging said camera plate away from said base.

According to another aspect said locking mode is actuated by a locking system comprising:
 a locking plate located in a floor of said socket, and including on an underside thereof a plurality of locking plate ball tracks defining a helical path,
 a locking ring located under said locking plate, and including on an upper side thereof a plurality of locking ring ball tracks defining helical paths to complement said locking plate ball tracks, and
 a plurality of ball bearings, each located within corresponding locking plate and locking ring ball tracks, and
 wherein rotation of said locking ring with respect to said locking plate causes the ball bearings to separate the locking ring from the locking plate to thereby clamp said mounting plate between said locking plate and said latching members.

According to another aspect there are between 3 and 6 corresponding sets of ball bearings and ball tracks.

According to another aspect the invention broadly comprises a quick release mounting system comprising:
 a mounting plate including at least one latching surface, a base having a socket for receiving said mounting plate, and at least one movable latching member for engaging with a said latching surface of said mounting plate to prevent separation of said mounting plate from said socket, and wherein said mounting system further comprises a locking mechanism for clamping said mounting plate within said socket, said locking mechanism operating to push said mounting plate in a direction perpendicular to said base against said at least one latching member.

According to another aspect the invention broadly comprises a quick release mounting system substantially as herein described and with reference to any one or more of FIGS. 1 to 12.

According to another aspect the invention broadly comprises a quick release mounting system substantially as herein described and with reference to any one or more of FIGS. 13 to 14.

According to another aspect the invention broadly comprises a quick release mounting system substantially as herein described and with reference to any one or more of FIGS. 15 to 22.

According to another aspect the invention broadly comprises a quick release mounting system substantially as herein described and with reference to any one or more of FIGS. 23 to 25.

According to another aspect the invention broadly comprises a quick release mounting system substantially as herein described and with reference to any one or more of FIGS. 26 to 27.

Other aspects of the invention may become apparent from the following description which is given by way of example only and with reference to the accompanying drawings.

As used herein the term "and/or" means "and" or "or", or both. As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which:

FIG. 12a is a cross sectional view of the locking mechanism of FIG. 11, shown in a locked condition.

FIG. 12b is a schematic cross sectional view of the locking mechanism of FIG. 10, shown in an unlocked condition.

FIG. 13a is a schematic view of an alternative locking mechanism concept.

FIG. 13b is a schematic view of another alternative locking mechanism concept.

FIG. 14 is a schematic view of another alternative locking mechanism concept.

FIG. 15a is a schematic representation of a release mechanism, shown in a latched state.

FIG. 15b is a schematic representation of a release mechanism, shown in an unlatched state.

FIG. 15c is a schematic representation of a release mechanism, shown with a camera plate removed.

FIG. 16a is a schematic representation of an alternative release mechanism.

FIG. 16b is a schematic perspective representation of an alternative release mechanism.

FIG. 17a is a schematic representation of another alternative release mechanism, shown in a latched state.

FIG. 17b is a schematic representation of another release mechanism, shown in an unlatched state.

FIG. 18a is a schematic representation of another alternative release mechanism, shown in a latched state.

FIG. 18b is a schematic representation of another alternative release mechanism, shown in an unlatched state.

FIG. 18c is a schematic representation of another alternative release mechanism, shown with the camera plate removed.

DETAILED DESCRIPTION OF PREFERRED EMBODIMENTS

Figure 1:
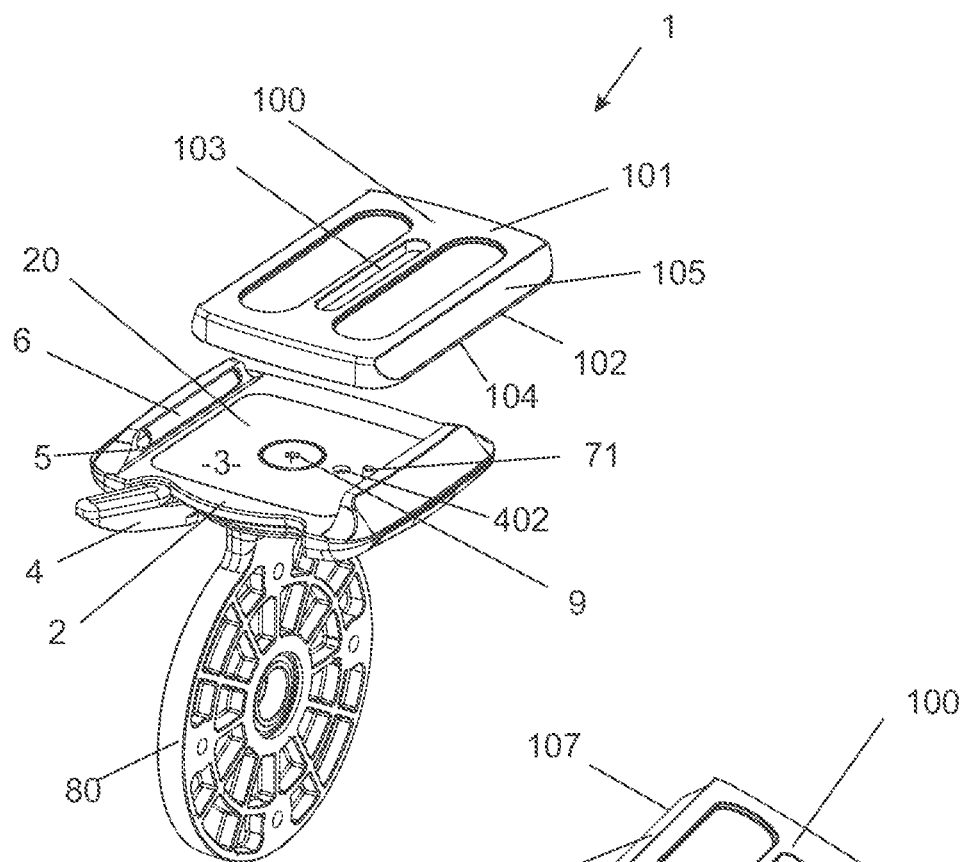
FIG. 1 is a perspective view of a quick release camera mount according to a first configuration.

According to various aspects of the various embodiments of the present invention as illustrated in FIGS. 1-27, there is provided a quick release mount which will now be described, particularly and as a camera mount.

In FIGS. 1-12 there is shown a substantially rectangular quick release camera mount 1 that is easy to operate, secure, reliable and easy to manufacture. The quick release camera mount 1 is configured to receive a camera plate 100. The camera mount 1 comprises a body 2, a base 3, a locking controller 4, and latching members 6 operating in slots 5.

The quick release camera mount 1 is preferably used to attach an optical device, such as a camera to another object such as a stand, camera slider, or bicycle mount, for example via bottom mount 80.

It will be appreciated that the quick release camera mount is also suitable for mounting other objects as is generally known, and in particular for other applications where a quick release locking mechanism is useful. For example, there are many other optical devices, lasers and technical and/or scientific instruments which can benefit from a stable mount.

The quick release camera mount 1 may preferably operate in a latched mode, locked mode, and a release mode.

In a latched mode the quick release camera mount 1 captures the camera plate 100 when the camera plate is inserted. In the latched mode, the quick release camera mount 1 preferably prevents the camera plate 100 from moving vertically or from unintentional release from the body 2. In the latched mode, the camera plate 100 is able to slide within the quick release camera mount 1 in a limited linear motion to allow the user to make small adjustments to the position of the camera plate 100. Preferably the camera plate 100 can be inserted into the quick release camera mount 1 by one-handed operation by simply pressing the plate 100 into the mount body 2.

In a locked mode a locking mechanism clamps the camera plate 100 in the quick release camera mount to prevent movement of the camera plate, so that the plate is substantially rigidly held in place. In the locked mode, the camera plate 100 is secure and stable to keep an attached device stationary to prevent 'camera shake'.

In a release mode a releasing mechanism in the quick release camera mount 1 frees the camera plate 100. The camera plate 100 can be removed vertically and/or optionally laterally from the quick release camera mount 1 in the release mode, as will be described with respect to alternative configurations.

Camera Plate

The camera plate 100 as shown in FIG. 1 is preferably generally rectangular and comprises a top 101, a base 102, an aperture 103, a perimeter 104, latching surfaces 105 and a bottom edge 107. The camera plate top 101 is substantially flat to allow a device to lie flat against the camera plate 100.

Preferably, the plate aperture 103 is configured to allow a securing means, such as a bolt to pass through and secure a device, such as a camera (not shown). Devices such as cameras typically include a standard threaded recess for this purpose.

The camera plate 100 comprises at least one latching surface 105, although two latching surfaces 105 on opposing sides are preferred. The latching surfaces 105 may be planar, or alternatively curved (either generally convex, or generally concave).

Figure 2:
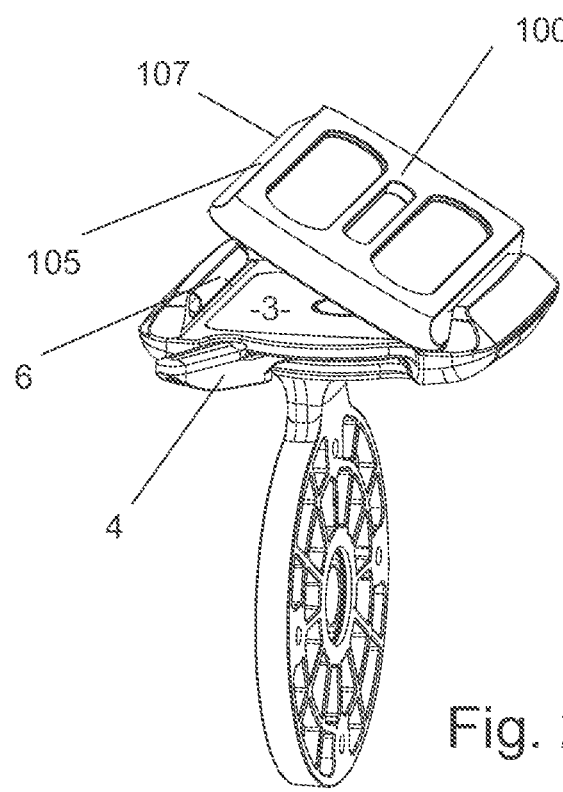
FIG. 2 is a perspective view of the camera mount of FIG. 1, showing the camera plate partially engaged.

To insert the camera plate 100, as best shown in FIG. 2, the quick release camera mount 1 captures the camera plate by engaging with the latching surfaces 105 the camera plate 100. Alternatively, it will be appreciated that the camera plate 100 can be pushed into the camera mount body 2 by inserting directly downwards.

The connection between the camera plate 100 and the body or base unit 2, is similar to a dovetail joint where a tapered tennon (i.e. camera plate 100 with latching surfaces 105), engages with the mortise (i.e. base unit 2 having correspondingly angled sidewalls 7, including latching members 6).

Preferably the latching surfaces 105 of the camera plate 100 are generally obliquely oriented as shown, in a dovetail plate configuration.

Preferably, the latching surfaces 105 are between approximately 30° and 60° relative to the base 102 of the camera plate 100.

Most preferably, the latching surfaces 105 are approximately 45° relative to the base 102 of the camera plate 100.

Figure 4:
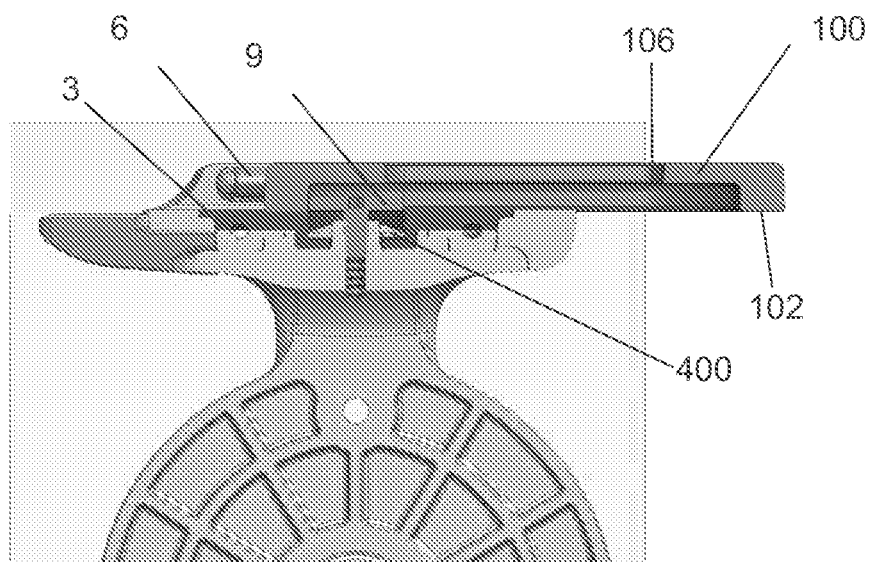
FIG. 4 cross sectional view of a camera mount according to a variation on the mount of FIG. 1.

Optionally, the camera plate 100 comprises a slide stop groove 106 on the plate base 102 as shown in FIG. 4. The slide stop groove 106 extends partially along the length of the camera plate 100. Preferably the slide stop groove 106 extends along the length of the camera plate 100 without reaching the perimeter 104 of the plate.

Latching Mechanism

Represented in FIGS. 1-6 there is shown a quick release camera mount 1 having a latching mechanism.

As shown in FIG. 2, the camera plate 100 is inserted downwards into the quick release camera mount 1. Alternatively the camera plate 100 (in some configurations) may be inserted into the quick release camera mount 1 by sliding laterally into the quick release camera mount.

Once the camera plate 100 is inserted into the quick release camera mount 1, the camera mount automatically captures the camera plate 100 into a latched mode, as the latching member(s) 6 spring back into position. A release mechanism is required to release the camera plate 100 from the latched mode.

Figure 3:
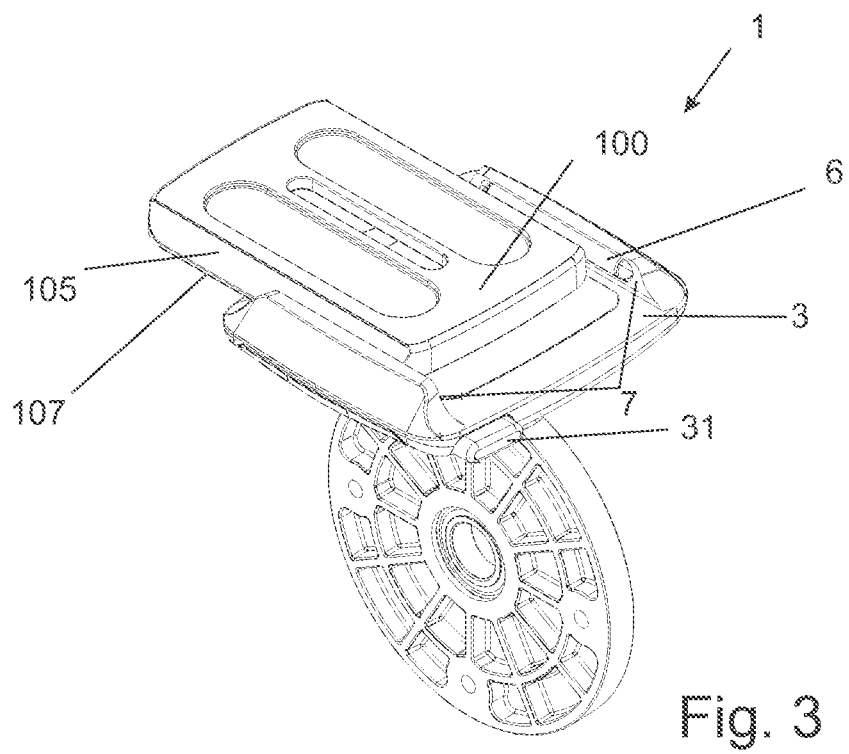
FIG. 3 is another perspective view of the camera mount of FIG. 1 shown with the camera plate sliding in the mount.

In the latched mode, the quick release camera mount 1 is constrained from separating from base 2, but can still move in a direction parallel to the internal sidewalls 7 of the quick release camera mount as shown in FIG. 3. In the latched mode, the camera plate 100 can translate in a limited lateral motion to allow small adjustments of the camera plate 100. It is useful to allow adjustment of a camera plate 100 towards and away from a target object, before the camera plate 100 is locked firmly (i.e. essentially rigidly) into a final position.

Figure 5:
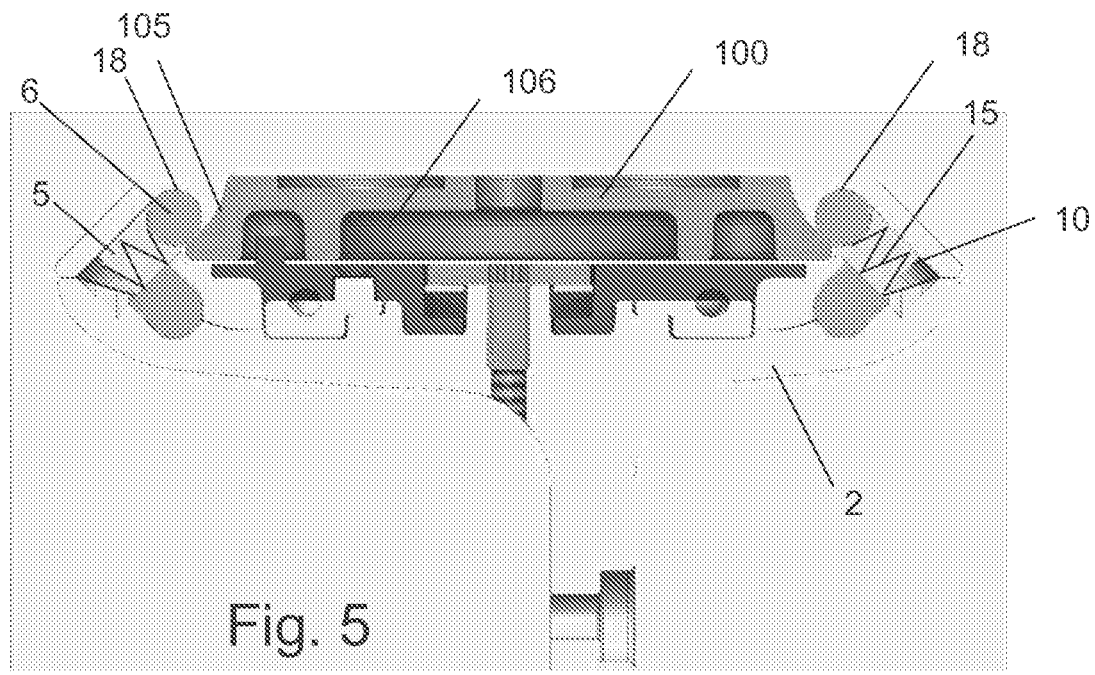
FIG. 5 is a schematic cross section view of the camera mount of FIG. 1, shown with a camera plate engaged.
Figure 6:
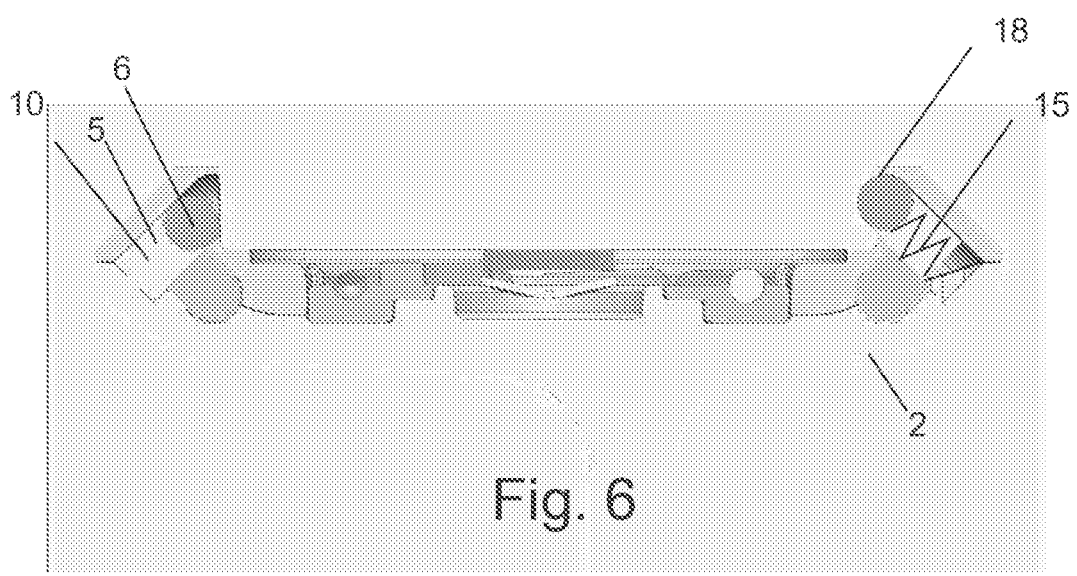
FIG. 6 is a schematic cross section view of the camera mount of FIG. 5, shown with the latching member in and unlatching condition and the camera plate removed.

As most clearly shown in schematic FIGS. 5 and 6, there is shown a quick release camera mount 1 comprising slots 5, within which are latching members 6, and corresponding biasing means 15 (shown schematically).

The latching members 6 are cylindrical bearings and preferably allow smooth rotation (about a cylindrical axis) within the slot 5. This feature allows smooth interaction between the latching members 6 and the camera plate 100, when the plate is inserted. The latching members 6 are held on freely spinning pins (not shown) in the slot 5, such that the latching members 6 can rotate about their axis.

The slots 5 constrain translational motion of the latching members 6 along a straight linear path 10, which is configured and dimensioned to match the diameter of the latching members 6. The latching members 6 move between a latched condition (FIG. 5) and a retracted condition (FIG. 6), in order to capture and release a camera plate 100 respectively. In particular, it is preferred that the latching members 6 are biased into the latched position, such that the mechanism 'automatically' captures and latches onto a camera plate 100 as it is inserted into the body 2.

Most preferably, the slots 5 form oblique pathways 10. The oblique pathways 10 are preferably approximately parallel to the latching surface 105 of the camera plate 100.

The latching members 6 are also preferably constrained from exiting the slots 5 beyond the latching condition by a constraining surface 18. The constraining surface 18 creates a passageway smaller than the diameter of the latching members 6 to prevent the latching members 6 from ejecting out of the slot 5.

Biasing means 15 biases the latching members 6 to extend at least partially outward of the slot 5, to engage with the latching surfaces 105 of the mounting plate 100, in order to prevent the mounting plate separating from the body 2. Most preferably, the biasing means 15 is a spring, such as a coil spring or leaf spring, or any other suitable biasing means. However, it is noted that FIGS. 5 and 6 illustrate the biasing means 15 schematically. Some example mechanisms for biasing (and releasing) the latching members 6 will be described in more detail below.

Preferably the biasing means 15 is strong enough to bias the latching member 6 to extend at least partially outward of the slot 5, but not so strong that it makes it difficult to remove the camera plate 100, during the release procedure. For example, it may be preferred that the biased latching members 6 are able to prevent the camera plate 100 from being released from the body 2 under its own weight (i.e. if the camera mount was tipped upside down for example).

As the camera plate 100 is inserted into the quick release camera mount 1, the perimeter 104 of the camera plate 100 engages with the latching members 6 forcing them to retract within the slot 5, a sufficient distance to allow an edge of the camera plate 100 to slip past the latching member 6. At this stage, the latching member 6 returns to an at least partially extended position, to capture the camera plate 100 in a latched condition. In the latched condition, the camera plate 100 may slide between the walls 7, but cannot be removed vertically from the quick release camera mount 1 as shown in FIGS. 3 and 4.

Preferably the camera plate 100 is prevented from sliding completely off the quick release camera mount 1 in the latching mode, and this may be achieved in a number of ways. For example, the quick release camera mount 1 may comprise a screw stop 9 as shown in FIG. 4 in particular. The screw stop 9 is positioned slightly above the base 3, so that it can engage with a complementary screw stop groove 106 on the underside of plate 100. The screw stop 9 prevents the camera plate 100 from being accidently pushed out of the quick release camera mount 1 by constraining the sliding motion of the camera plate.

The sliding motion of the camera plate 100 is limited to a path created by the slide stop groove 106 in the camera plate 100 as best shown in FIG. 4, where an end wall portion of the groove 106 abuts the screw stop 9. The limited sliding motion in the latching mode allows the user to make small adjustments to the position of the camera plate 100, and any device attached to the plate. It will be appreciated that the screw stop 9 may be wound into a functioning raised position (as shown in FIG. 4), or may be wound down until it takes up an essentially flush position as shown in FIG. 1. This feature allows the camera mount 1 to be potentially used with different style camera mounting plates 100 as desired.

Alternatively (or in addition), the quick release camera mount 1 may comprise a spring loaded pin 71 at the base 3 of the camera mount, as best shown in FIG. 1. The spring loaded pin 71 engages with a complimentary groove (not shown) on the plate base 102 of the camera plate 100, in a manner similar to groove 106 described above. The spring loaded pin 71 prevents the camera plate 100 from being accidently pushed out of the quick release camera mount 1. An advantage of using a spring loaded pin 71 is that it allows the quick release camera mount 1 to be used with a larger range of camera plates 100. The spring loaded pin 71 retracts when it engages with a surface on the base 102 of a camera plate 100 (in the event the base has no corresponding slot), but is biased into an extended position so that the pin 71 can enter a corresponding slot in the plate base 102 if present.

Release Mechanism

To release a camera plate 100 from the quick release camera mount 1, a release mechanism allows the latching member(s) 6 to retract into the slot 5 of the quick release camera mount as shown in FIG. 6 (left hand slot 5). In the release mode, the latching member 6 disengages from the latching surface 105 of the camera plate 100, and the camera plate 100 is free to be removed from the quick release camera mount 1.

Preferably, the release mechanism counteracts the biasing means 15 in the slot 5 moving the latching member 6 to retract into the slot 5 along the pathway 10. The counteracting mechanism forces the latching member 6 against the force of the biasing means 15.

Figure 7:
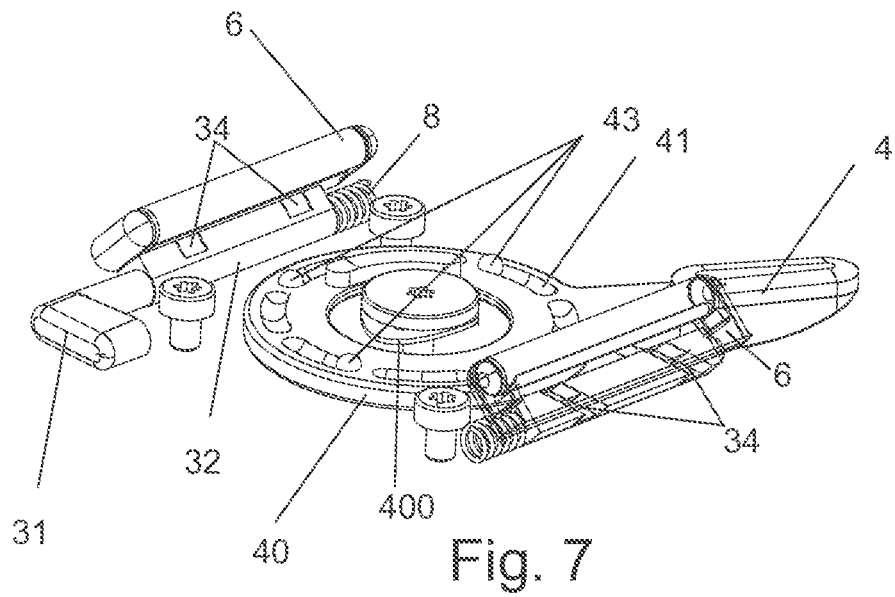
FIG. 7 is a partially exploded view of the latching mechanism of the camera mount of FIG. 1.

As shown in FIGS. 3 and 7, the quick release camera mount 1 comprises one or more release buttons 31.

The release button 31 is connected to a release body 32 comprising an angled guiding slots 34 best shown in FIG. 7, where one of the latching member assemblies 6 is shown transparently to illustrate the mechanism. It will be appreciated that when the release button 31 is pushed to compress release spring 8, the angled guiding slots 34 interact with corresponding pins on the latching member 6, in order to cause the latching member 6 to retract into the slot 5. In the retracted position, the camera plate 100 is free to be removed from the quick release camera mount 1.

In the embodiment illustrated in FIG. 7, only one latching member 6, is equipped with a corresponding release button 31. However, it will be appreciated that both latching members 6 could be actuated by a single release button 31 (via a linkage between), or alternatively have independent release buttons, depending on the desired user functionality.

Alternatively, the release button may not itself move the latching member(s) 6, but rather allow the latching member 6 to retract, for example by relieving some, or all, of the biasing force. With this type of configuration, as the camera plate 100 is removed from the quick release camera mount 1, the bottom edge 107 of the camera plate 100 forces the latching members 6 to retract into the slot 5 of the quick release camera mount.

Locking Mechanism

An additional function of the camera mount 1 comprises a locking mechanism for a quick release camera mount 1. This feature is best described with reference to FIGS. 7-12. It should be appreciated that this locking mechanism can be used with the previously described latching mechanism above, or with some other suitable latching mechanisms known in the art, and in particular those latching mechanisms that include obliquely oriented locking members, that engage with 'dove tail' camera plates 100.

In a locked mode, the quick release camera mount 1 clamps and secures the camera plate 100 to prevent movement of the camera plate. In this mode, the connection between the camera mount 100 and the body 2, is preferably essentially rigid.

In the preferred embodiment, the camera plate 100 is secured to the quick release camera mount body 2 by a lifting locking mechanism. The locking mechanism secures the camera plate 100 by clamping the camera plate 100 against the latching members 6.

The lifting locking mechanism preferably comprises a locking controller 4 (e.g. a lever), a lock ring 40, a plurality of ball bearings 43 and a locking plate 20. To operate the lifting locking mechanism, the locking controller 4 rotates the lock ring 40 with ball bearings 43 to lift the locking plate 20. As the locking plate 20 is lifted, the camera plate 100 is lifted and clamped against latching members 6 (which cannot move upwards because they are constrained by slots 5, and end constraint surface 18).

A lifting locking mechanism is advantageous as it operates independently of the latching mechanism, and operates in a different direction to the latching mechanism. Additionally, the locking plate 20 has a large surface area which engages with the camera plate 100 to provide a reliable and stable surface. A quick release camera mount 1 comprising a locking plate 20 with a large surface area acting on a camera plate 100 is particularly suited for heavy loads. A stable locking mechanism is particularly desirable for operation with large camera devices.

Figure 10:
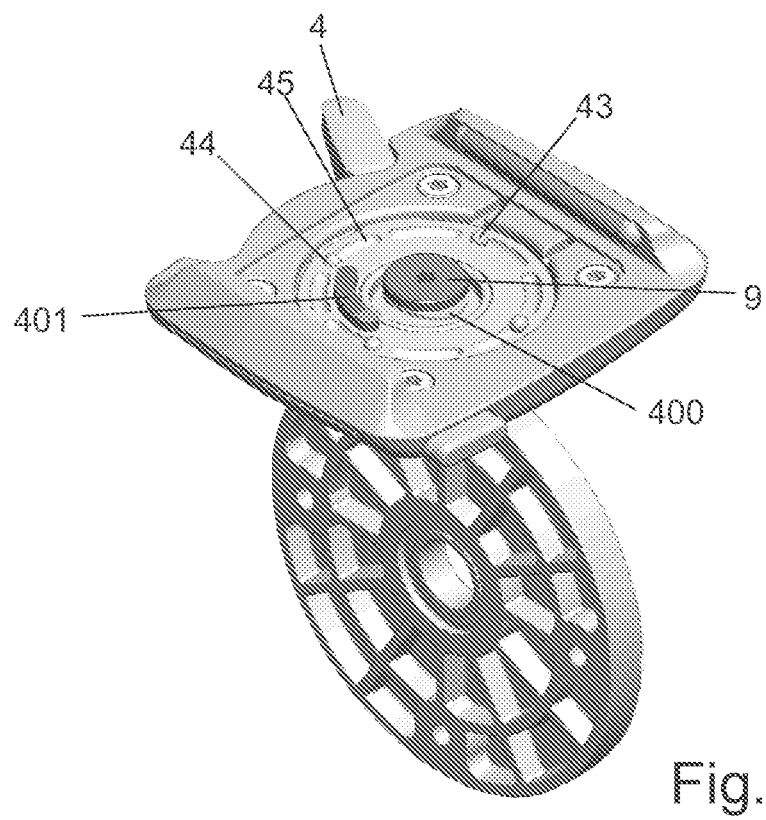
FIG. 10 is a partially disassembled view of the locking mechanism of the camera mount of FIG. 1, shown in an unlocked condition.
Figure 11:
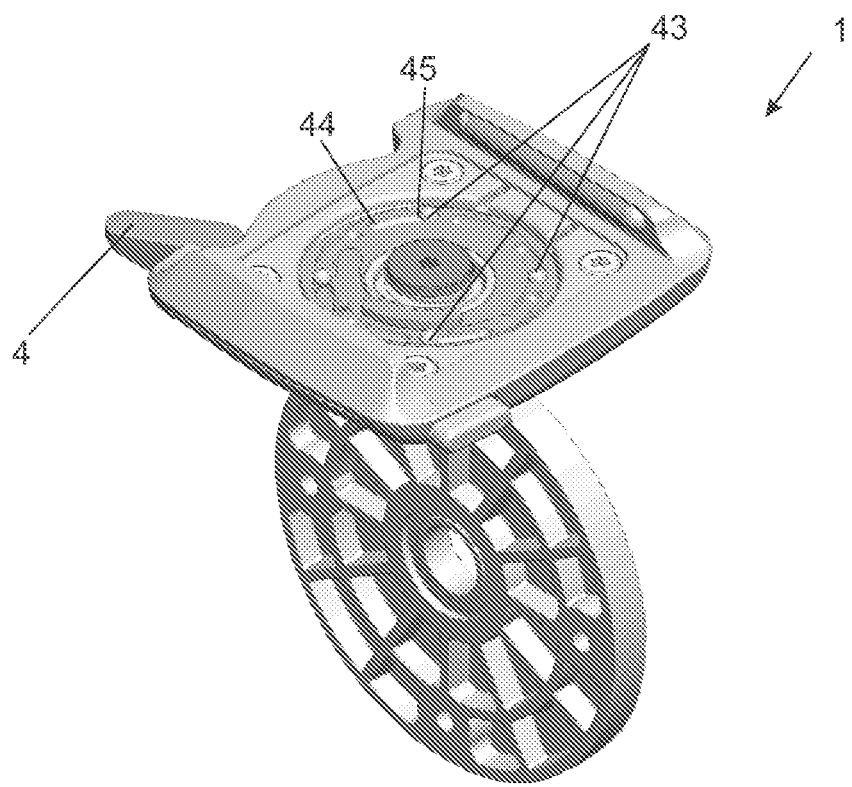
FIG. 11 is a partially disassembled view of the locking mechanism of the camera mount of FIG. 10, shown in a locked condition.

The locking controller 4 moves the quick release camera mount 1 between a locked condition (FIG. 11) and an unlocked condition (FIG. 10). Preferably the locking controller 4 is a lever comprising a projecting arm or handle. A lever 4 is easy for the user to control, and is intuitive to use.

Preferably the locking ring 40 also includes an indicator portion 401. The indicator portion may include differently coloured sections (for example red and green), which move with the locking ring between the locked and unlocked conditions. As shown in FIG. 1, an indicator window 402 may be provided, through which the differently coloured portions of the locking indicator 401 may be viewed. It will be appreciated that as the locking lever rotates, a coloured portions (e.g. red for locked, and green for unlocked) will come in to registration with the indicator window 402.

The locking controller 4 is attached to a lock ring 40 that comprises at least one ramped ball track 41, with ramps 42 having a sloping surface following a helical path. Preferably the lock ring 40 comprises four ramped ball tracks 41, although any other suitable number may be utilised.

Ball bearings 43 are constrained within the ramped ball tracks 41 of the lock ring 40, best shown in FIG. 7. The ball bearings 43 has a diameter equal to or less than the width of the ramped ball tracks 41. The ball bearings 43 separates the locking plate 20 above the lock ring 40. The ball bearings 43 are smooth and reduce rotational friction between the lock ring 40 and the locking plate 20 as the quick release camera mount 1 transitions between a locked and unlock condition. The lifting locking mechanism is able to operate more smoothly with ball bearings 43 than if the lock ring 40 was in direct contact with the locking plate 20. A plurality of ball bearings 43 provides a number of contact points to reduce friction and bear loads. The quick release camera mount 1 can be adapted to secure heavy devices by using more ball bearings 43 to provide a higher number of contact points against the locking plate 20.

Figure 8:
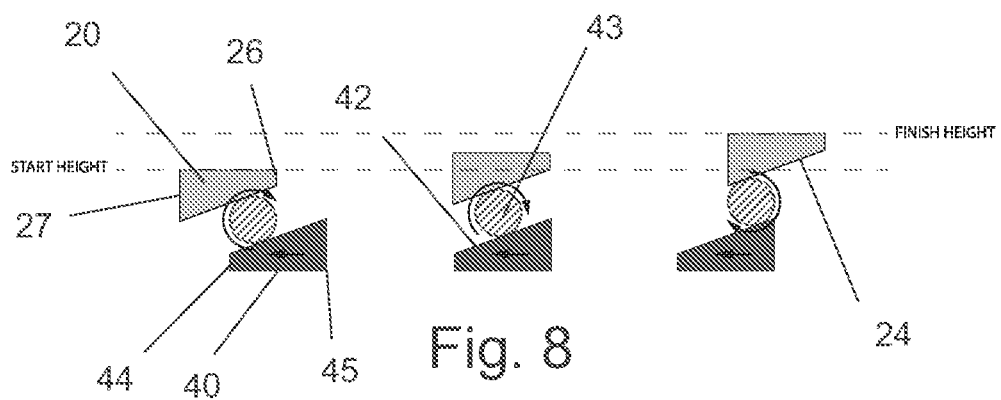
FIG. 8 is a schematic representation of a locking mechanism concept.
Figure 9:
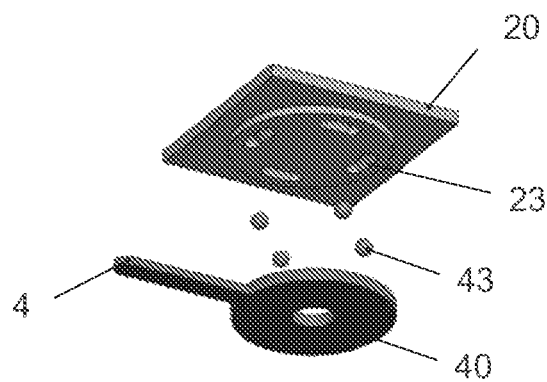
FIG. 9 is a schematic representation of a further locking mechanism concept.

The locking plate 20, (best shown in schematic FIG. 9, and FIGS. 12a and 12b), comprises a top surface 21 forming a substantially flat surface substantially parallel to the base 3 of the quick release camera mount to allow a camera or other device to be mounted on a flat surface. Preferably, the locking plate 20 comprises at least one ramped ball track 23 at the base 22 of the locking plate complementary to the ramped ball track 41 of the lock ring 40. As illustrated schematically in FIG. 8, the locking plate ramped ball track comprises a ramped surface 24 with a locked end 26 and an unlocked end 27. The locked end 26 is thinner than the unlocked end 27. The locking plate ramped ball track has a ramp 24 configured to operatively correspond with to the lock ring ramp 42 as shown in FIG. 8.

The rotation of the lock ring 40 in a first direction lifts the locking plate 20 from a lower start height to a higher finish height as the bearings 43 moves between the unlocked end 44 and a locked end 45, in order to raise the locking plate, and clamp the latching members 6. As the lock ring 40 rotates in the first direction, the lock ring 40 moves from engaging with the ball bearing 43 at the unlocked end 44 to the locked end 45. The ball bearing 43 also moves from engaging the locking plate 20 at the unlocked end 27 to the locked end 26.

A biasing means 400 such as a spring washer, or compressible O-ring for example, may be provided between the screw 9 and the locking plate 20. This biasing means 400, functions to keep the balls 43 in registration with the slots on the respective locking plate 20 and locking ring 40.

As the lever 4 rotates, the ball bearings 43 also rotate. For example as the lever 4 rotates anti-clockwise towards a locked position from FIG. 10 to FIG. 11, the ball bearings travel clockwise up the ramp 42 of the ramped ball track 41 of the lock ring 40. The ball bearings 43 move upwards in a helical movement as the lock ring 40 rotates beneath the ball bearings from engaging at the unlocked end 44 to the locked end 45. As the ball bearings 43 move upwards, the locking plate 20 is forced to lift upwards.

With reference to FIG. 12a, as the locking plate 20 moves upwards, the camera plate 100 is also forced into a locked position. The upward movement of the locking plate 20 clamps of the latching surface 105 of the camera plate 100 against the latching members 6 of the quick release camera mount 1.

To unlock the quick release camera mount 1, the lever 4 may then be rotated in a second direction to lower the locking plate 20 downwards. As the locking plate 20 moves downwards, the camera plate 100 un-clamps from the latching members 6 of the quick release camera mount 1 to an unlocked position.

For example, to lower the locking plate 20 downwards, the lever 4 is rotated clockwise. The ball bearings 43 move from engaging at the locked end 45 to the unlocked end 44 of the lock ring 40, where the locked end 45 is less deep than the unlocked end 44. As the lever 4 rotates clockwise, the ball bearings 43 travel anti-clockwise in the ramped ball track 41 of the lock ring 40.

The difference in depth of the ramped ball track 41 between the unlocked end 44 and the locked end 45 is sufficient to provide the necessary clamping force to the latching members 6.

Alternative Release Mechanisms

To release a camera plate 100 from the quick release camera mount 1, a number of alternative release mechanisms could be employed to unlatch the latching member 6 of the quick release camera mount 1.

It should be appreciated that these release mechanisms can be used with the previously described latching and/or locking mechanisms above, or other mechanisms.

According to one type of release mechanism, when in the release mode the latching member 6 is no longer constrained to move only in the linear pathway 10 of the slot 5. In particular, the alternative release mechanisms allow for translation of the latching member 6 by providing an extra degree of movement for the latching member 6.

For example, as shown in schematically FIG. 15*a-c*, the quick release camera mount 1 optionally comprises a movable side wall 16. In an unreleased condition, the movable side wall 16 forms part of the slot 5 wall, and constraining movement of the latching member 6 a linear pathway 10. In this condition, attempted movement of the camera plate 100 out of the base socket, tends to push the latching member 6 further towards its latched position (where surface 18 prevents the latching member from exiting slot 5). Accordingly, the camera plate 100 cannot be released.

In a released condition, the movable side wall 16 moves outwards (i.e. away from plate 100) to provide an additional degree of freedom of translation movement for the latching member 6. The movable side wall 16 moves far enough so that the latching member 6 has enough space to clear the path of the camera plate 100 being removed (FIG. 15*b*).

In an alternative embodiment, the movable side wall 16 may move upwardly (or a combination of upwardly and outwardly). It will be appreciated that due to the obliquely angled orientation of the slot, either of these movements of sidewall 16 will provide the necessary additional degree of freedom of translational movement for the latching member 6, away from mounting plate 100. When the moveable side wall 16 moves upwardly and/or outwardly, a space 19 is created where the moveable side wall 16 was located in the unreleased condition.

It will be appreciated that, in the released condition the latching member 6 no longer latches the latching surfaces 105 of the camera plate 100, and the camera plate 100 is free to be removed from the quick release camera mount.

Alternatively, shown in FIG. 16, the quick release camera mount 1 comprises a release member 14 which engages with the latching member 6 in the slot 5. The release member 14 has a thick end and a narrow end (as shown in FIG. 16*b*). The thick end of the release member 14 is preferably biased to engage with the latching member 6 to force the latching 6 to be at least partially outward of the slot 5. In this latched position, slot 5 constrains movement of latching member 6 along a single translational direction, as described previously.

When the release member 14 is pushed along the slot 5, the narrow end of the release member 14 is positioned adjacent the latching member 6. As a result, the latching member 6 is free to retract away from the mounting plate 100, along an additional degree of translational freedom.

Alternatively, in FIG. 17 there is shown a quick release camera mount 1 comprising a rotating cam 70. In the unreleased condition, the rotating cam 70 constrains the latching member 6 to move in a linear pathway 10. When the rotating cam 70 rotates backwards in the slot 5 and away from the latching member 6, the latching member is no longer constrained to move only in a linear pathway 10. A space 19 is created where the rotating cam 20 was located in the unreleased condition allowing latching member 6 two translate outwardly (i.e. with an additional degree of translational freedom) into the space 19. In the released condition the latching member 6 no longer latches the latching surfaces 105 of the camera plate 100, and the camera plate 100 is free to be removed from the quick release camera mount.

Alternatively still, in schematic FIG. 18 there is shown a quick release camera mount 1 comprising a release tab 30 attached to the latching member 6. This release mechanism counteracts the biasing means 15 in the slot 5, to retract the latching member 6 into the slot 5 of the quick release camera mount 1 along the constrained linear pathway 10. To counteract the biasing means 15, the release tab 30 is pulled in a direction opposite to the biasing direction. The release tab 30 and the latching member 6 is pulled outwardly and downwardly into a retracted position. In the retracted position, the camera plate 100 is free to be removed from the quick release camera mount 1.

Figure 19:
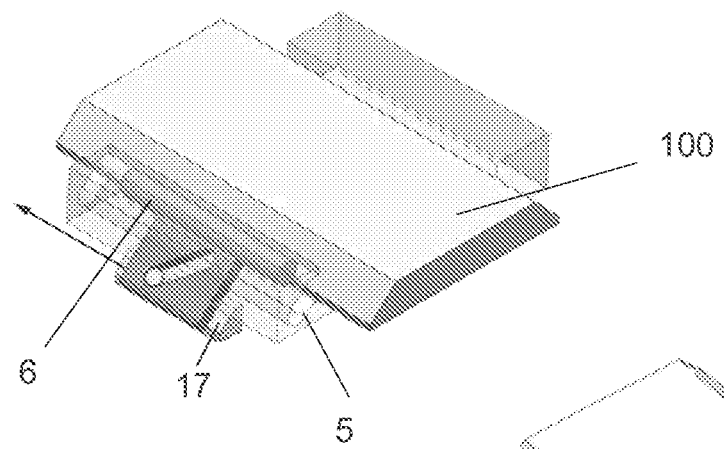
FIG. 19 is a schematic representation of another alternative release mechanism.

Optionally, in FIG. 19 there is a release tab 30 having an angled slot which can be employed to retract the latching member(s) 6. The angled slot interacts with a pin on sliding member 17, such that as member 17 moves in the direction of the arrow, the latching member 6, retracts into the slot 5.

Figure 20:
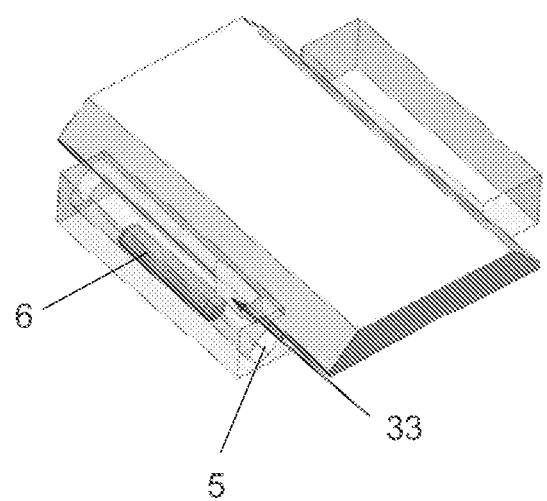
FIG. 20 is a schematic representation of another alternative release mechanism.

Alternatively, in FIG. 20 is a shown another quick release camera mount 1 comprising a cam button 33 within a slot 5 which engages with a latching member 6. The cam button 33 has a ramped surface at the end which engages with the latching member 6. In an unlatched position (not shown), the cam button 33 does not interact with the latching member 6, and allows it to take up its latching position. In the unlatched position (shown in FIG. 20), the cam button 33 engages with the latching member 6, and pushes it into a recess position within slot 5, thereby allowing camera plate 100 to be released.

It will be appreciated that a number of other design variations are possible for the latching mechanism, for example:

Optionally, the quick release camera mount 1 may comprise a plurality of slots 5, for a plurality of latching members 6 configured to engage along the length of mounting plate 100. In particular, in such embodiments the latching members 6 may be ball bearings rather than cylindrical latching members.

For example, each side of the camera mount 1 may comprise 2-8 ball bearings or more.

Optionally, the latching members 6 are cylindrical, a rectangular prism or a triangular prism for example.

Alternative Lift Locking Mechanisms

As shown schematically in FIGS. 13*a* & *b*, additional options for the lifting locking mechanism are provided. For example, a locking controller 4 may be configured to raise and/or lower locking plate 20 via wedge plate 50 which moves relative to the body 2 of the quick release camera mount 1.

In the unlocked condition, the wedge plate 50 is partially between the locking plate 20 the base 3 of the quick release camera mount 1. To move from an unlocked condition to a locked condition, the wedge plate 50 is inserted further between the locking plate 20 the base 3 of the quick release camera mount 1, so that it lifts the locking plate 20 upwards as it transitions from an unlocked to a locked condition.

As the locking plate 20 is forced upwards, the camera plate 100 is also forced upwards, and is clamped as described previously.

It will be appreciated that the wedge plate 50 has a ramped surface 28, that cooperates with a corresponding ramped surface on the underside of locking plate 20 (either integrally formed, or as a separate member).

The first side 51 of the wedge plate 50 is thicker than the second side 52 of the wedge plate, while the locking plate 20 comprises a complimentary wedge piece 25 having a first (thinner) side 26 and a second (thicker) side 27. In this embodiment the wedge plate 50 moves to a locked position when the second side 52 of the wedge plate 50 moves towards the second side 27 of the locking plate 20 causing the locking plate to move upwards.

In one configuration (shown in FIG. 13b) the locking control 4 is a lever. The lever 4 pivots to push the wedge plate 50 into the quick release camera mount 1.

In another configuration (shown in FIG. 13a) the locking controller 4 is a knob, comprising a threaded portion configured to interact with the body 2 of the camera mount. In this configuration as the knob is twisted in a first direction to move the wedge, the locking plate can be raised, or lowered by twisting in a second opposite direction.

With reference to FIG. 14, in another configuration the locking controller comprises a threaded shaft below the base 3 of the quick release camera mount 1. The threaded shaft is attached to the locking plate 20, at one end and engages by complimentary threads to the body 2 of the camera mount. As the threaded shaft is turned (by any suitable means) the end of the threaded shaft moves vertically relative to the base of the quick release camera mount, thereby lifting the locking plate 20.

Lateral Lock

Figure 21A:
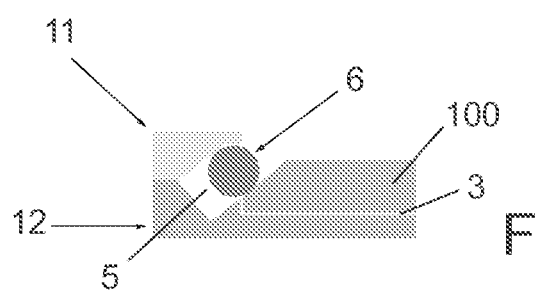
FIG. 21a is a schematic representation of another alternative locking mechanism, shown in a latched state.

In other configurations, the camera plate 100 is secured to the quick release camera mount 1 by a lateral locking mechanism, as illustrated schematically in FIG. 21.

Figure 21B:
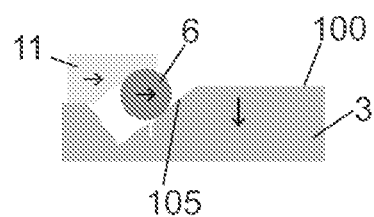
FIG. 21b is a schematic representation of another alternative locking mechanism, shown in a locked state.

For example, in one configuration the lateral locking mechanism comprises a quick release camera mount 1 comprising two body components 11,12, that define a constraining slot 5 along which a latching member 6 can translate in a single direction, substantially as previously described. However, in this embodiment the first component 11, is movable with respect to a second component 12. In particular, the first component 11 is able to move laterally in relation to the second component 12. In order to lock the camera plate 100, the first component 11 is moved laterally towards camera plate 100, and clamps the latching member 6 against the latching surface 5 of camera plate 100 (as shown in FIG. 21b). This in turn clamps the camera plate 100 against the base 3, and establishes an essentially rigid coupling.

Figure 21C:
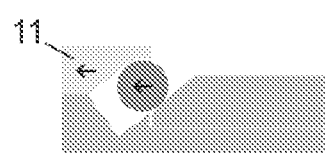
FIG. 21c is a schematic representation of another alternative locking mechanism.

As shown in FIG. 21c, the quick release mount 1 can be unlocked by moving the first component 11 back (away from latching member 6). In this unlocked position, the latching member 6 is free to move upwards and downwards in slot 5, and as described previously is preferably biased into a latching position).

With reference to FIGS. 22a-d, as an alternative variations of lateral locking mechanisms will be described in more detail.

Figure 22A:
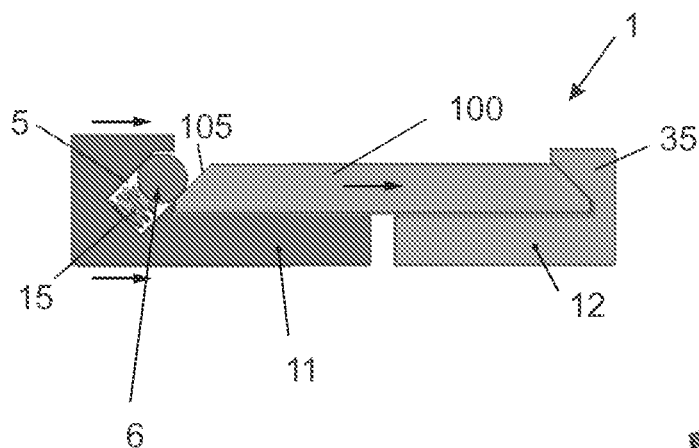
FIG. 22a is a schematic representation of another alternative locking mechanism.

As shown in FIG. 22a, a variation is schematically illustrated in which the movable component 11, provides slot 5. Additionally, this variation includes only one latching member 6 on one side of the camera mount 1. It will be appreciated that many of the embodiments described in this specification may be provided with latching members on one side only, while the other side engages with camera plate 100 via a fixed jaw 35.

Figure 22B:
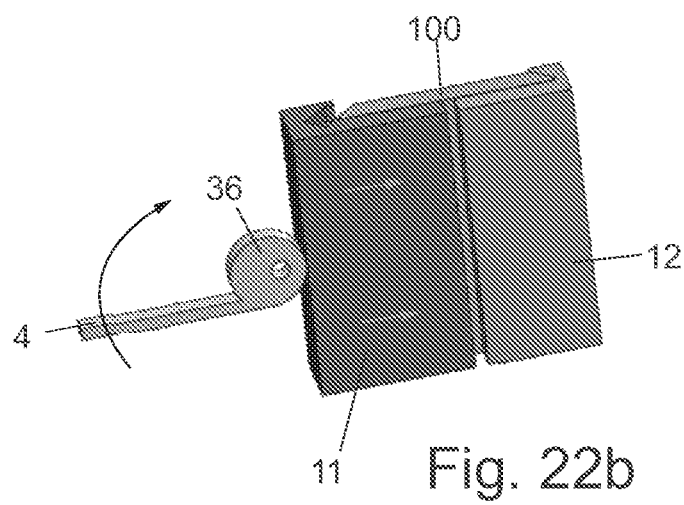
FIG. 22b is a schematic representation of another alternative locking mechanism.

As shown in FIG. 22b, a locking controller 4 is attached to one component 11 of the body 2. To lock the quick release camera mount 1, the locking controller 4, moves component 11 closer to the other component 12 of the body 2. It will be appreciated that the lever style locking controller 4, will apply a clamping force via cam surface 36.

As the first component 11 and the second component 12 of the body 2 are brought together, the camera plate 100 engages with the latching member 6 in a locked position.

Figure 22C:
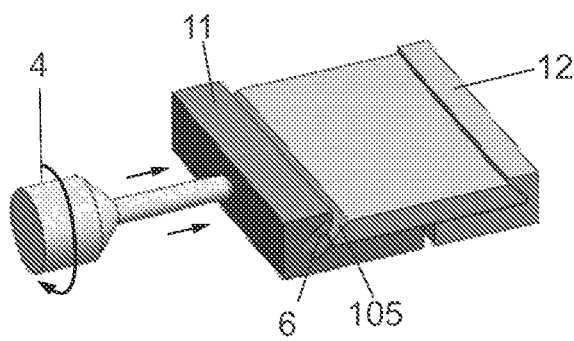
FIG. 22c is a schematic representation of another alternative locking mechanism.

As shown in FIG. 22c, an alternative threaded locking controller 4 is schematically illustrated. It will be appreciated that this locking controller 4 essentially operates in a similar manner to the lever design illustrated in FIG. 22b.

Figure 22D:
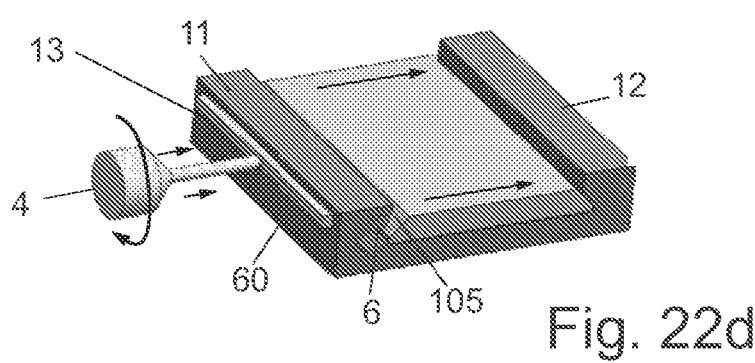
FIG. 22d is a schematic representation of another alternative locking mechanism.

In an alternative configuration as shown in FIG. 22d, the body 2 of the quick release camera mount 1 comprises a side aperture 13 in substantially the same plane as the latching member 6 in its latched condition. The lateral locking mechanism comprises a locking controller 4 attached to a side lock piece 60, positioned in the side aperture 13. Operation of the locking controller 4 translates the side lock piece 60, which in turn engages/this engages with the latching member 6.

In an unlocked condition the side lock piece 60 does not engage with the latching member 6, and allows the latching member to move along slot 5.

In a locked condition the side lock piece 60 engages with the latching member 6, and clamps it against latching surface 105 of camera plate 100, thereby securing the camera plate 100 firmly in place.

Circular Plate Quick Release Mechanism

Figure 23:
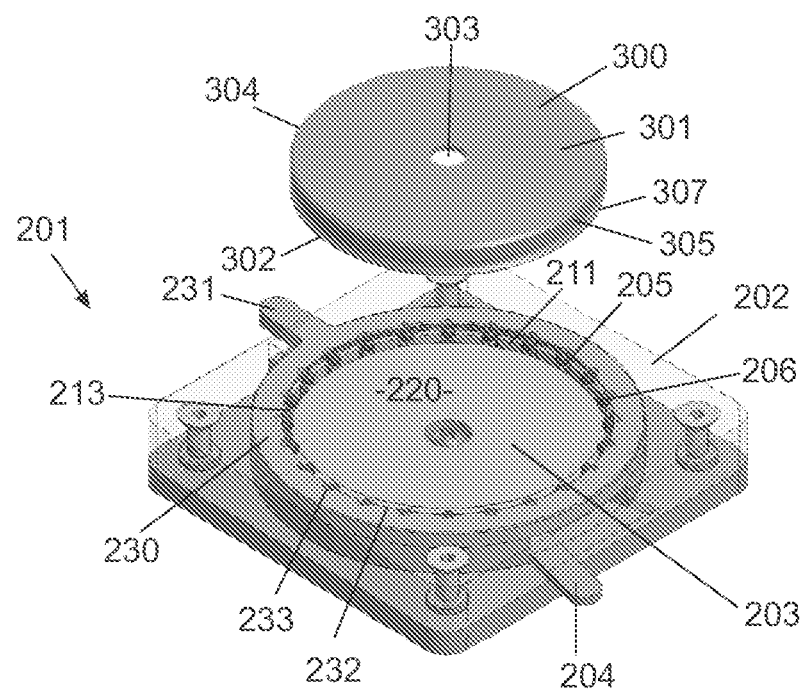
FIG. 23 is a partially transparent view of an alternative quick release camera mount.

In a further embodiment as shown in FIG. 23, the present invention is a quick release camera mount 201 comprising a body 202, defining a circular receiving bay 203, having a generally planar base 207. The receiving bay 203 is adapted to receive a substantially circular camera plate 300. The quick release camera mount 201 is reliable, easy to operate, ergonomic and intuitive to use.

The camera mount 201 may be used between a camera and tripod, or alternatively may be suited as a quick release mount for use between a tripod and a tripod head for example. It will be appreciated that the mount 201, may also be used in applications not involving camera equipment.

The quick release camera mount 201 may operate in a latched mode, a locked mode, and an unlatched mode. For example, in a latched mode the quick release camera mount 201 captures the circular camera plate 300, when the plate is inserted. In the latched mode, the quick release camera mount 1 prevents the camera plate 100 from being released, without separate operation of an unlatching mechanism. A latching ring 230 rotates to move the latching members 206 between a latched and unlatched condition.

In a locked mode a locking mechanism clamps the circular camera plate 300 in the quick release camera mount 201 to prevent movement of the camera plate. In the locked mode, the camera plate 100 secures and stabilises any attached device. To lock the quick release camera mount 201, a lock ring 240 rotates to lift a locking plate 220 to clamp the camera plate 300 against latching members 206.

A release mechanism is required to release the circular camera plate 300, and this can be achieved by rotating a latching ring 230 into an unlatched condition.

The circular camera plate 300 as shown in FIG. 23 comprises a top 301, a base 302, an aperture 303, a perimeter 304, and a latching surface 305. The latching surface 305 comprises a lip 307 that extends generally radially around the edge of the camera plate 300. Preferably, the plate aperture 303 is configured to allow a securing means, such as a bolt to pass through and secure a device, such as a camera.

As shown in FIG. 23, the quick release camera mount 201 comprises a plurality of slots 205 with a plurality of latching members 206.

Figure 25:
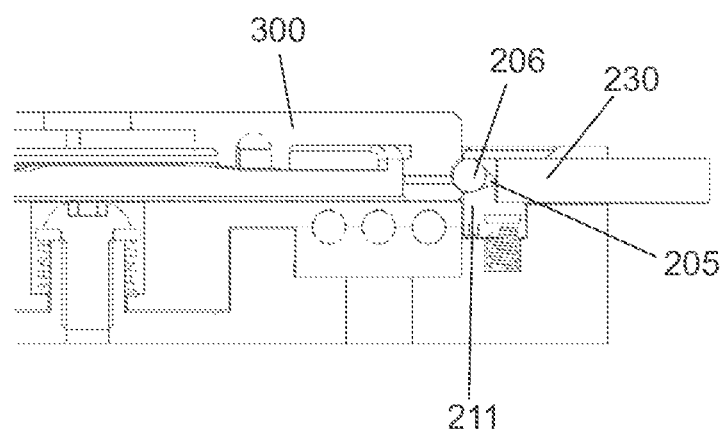
FIG. 25 is partial cross sectional view of the quick release camera mount of FIG. 23.

A biasing ring 211 biases the latching members 206 into a latched condition where they engage with a latching surface 305 of the circular camera plate 300. The latching members 206 are biased into a latching condition to extend at least partially outward of the angled slots 205 and into receiving bay 203. In this respect, the slots 205 operate in a similar manner as the previously described embodiment. Similarly, the slots are preferably angled between 30° and 60° from horizontal. Most preferably the slots are angled at 45° from the horizontal, as best illustrated in FIG. 25.

The latching members 206 are prevented from leaving the slots 205 by a constraining surface 218. The constraining surface 218 creates a passageway smaller than the diameter of the latching members 206 to prevent the latching members 206 from ejecting out of the slots 205.

The latching members 206 are biased upwardly into a latched position by a biasing ring 211 that preferably engages with all the latching members 206. For example, one or more springs 215, may be arranged under the biasing ring 211. This allows the camera plate 300 to be inserted into the receiving bay 203, when the latching ring is in the latched position (where it will be latched), or alternatively the released position (where it will not be held).

The biasing means 215 is strong enough to bias the latching members 206 to extend at least partially outward of the slots 205, but not so strong that it makes it difficult to take out the camera plate 300. This condition might be referred to as soft latching.

In order to remove the plate 300 from the camera mount 201, a latching controller 231 must be positioned to rotate the latching ring 230 from a latched condition to an unlatched condition. Preferably the latching ring 230 is biased into the latched condition by additional biasing means, such as a spring (not shown). This provides the camera mount with an 'automatic' latching function, allowing the plate to be pushed into place and automatically latched.

In an unlatched condition the latching ring 230 is rotated so that release cavities 233 are aligned with the latching members 206 (as shown in FIG. 23), and therefore the latching ring 230 is positioned out of engagement with latching members 206. In this position, the latching members 206 are no longer constrained against the latching surface 305 of the circular camera plate 300, and the camera plate 300 can be removed from the quick release camera mount. As the camera plate 300 is removed, the bottom edge 207 of the plate forces the latching members 206 to retract into the slots 205 of the camera mount.

In order to safely latch the camera plate 300 to prevent its removal, but still allow rotation, the latching ring 230 is rotated into a latched position via latching controller 231.

In the latched condition the latching ring 230 is rotated so that release cavities 233 are not aligned with the latching members 206, and therefore latching surfaces 232 of the latching ring 230 engage with latching members 206, preventing them from retracting within slots 205. In this position, the latching members 206 are engaged against the latching surface 305 of the circular camera plate 300, and the camera plate 300 cannot be removed from the quick release camera mount, due to the extending lip 307.

However, because the latching members are only pushed against the camera plate 300 by the biasing ring 211, the camera plate 300 can still be rotated within the receiving bay 203. This feature can be helpful to allow the camera (or other mounted device) to be rotated into a desirable position.

Figure 24:
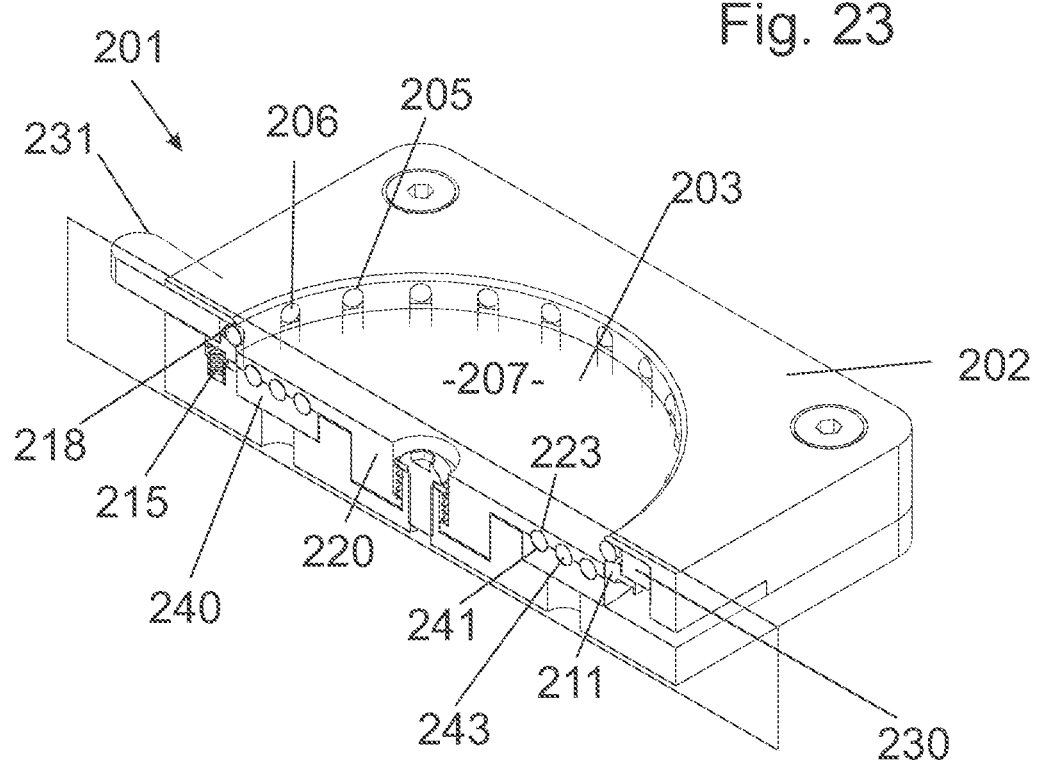
FIG. 24 is a cross sectional view of the quick release camera mount of FIG. 23.

Most preferably, the latching members 206 are a plurality of ball bearings as shown in FIGS. 23 and 24. Ball latching members 206 allow smooth rotation within the slot 205 to allow smooth interaction between the latching members 206 and the camera plate 300.

Figure 26:
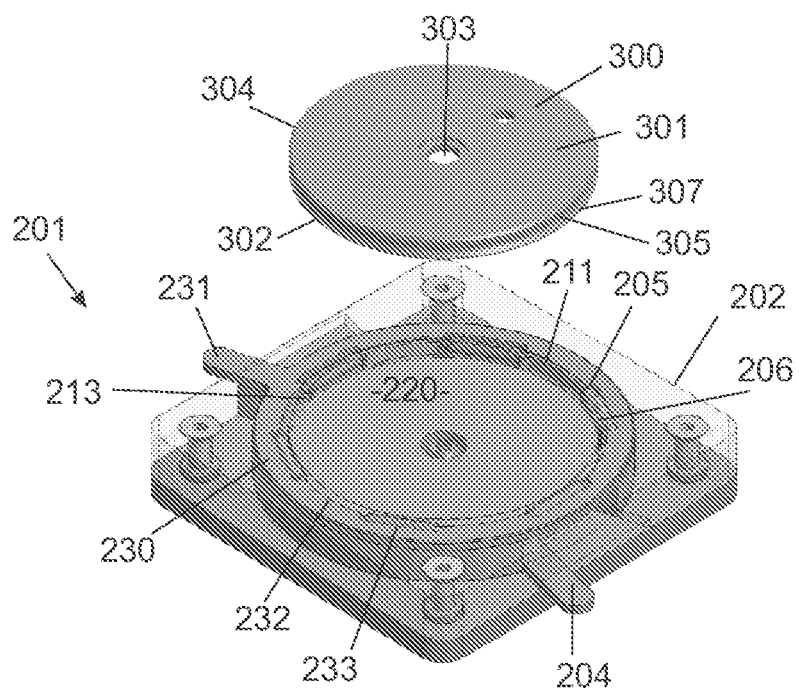
FIG. 26 is a partially transparent view of another alternative quick release camera mount.
Figure 27:
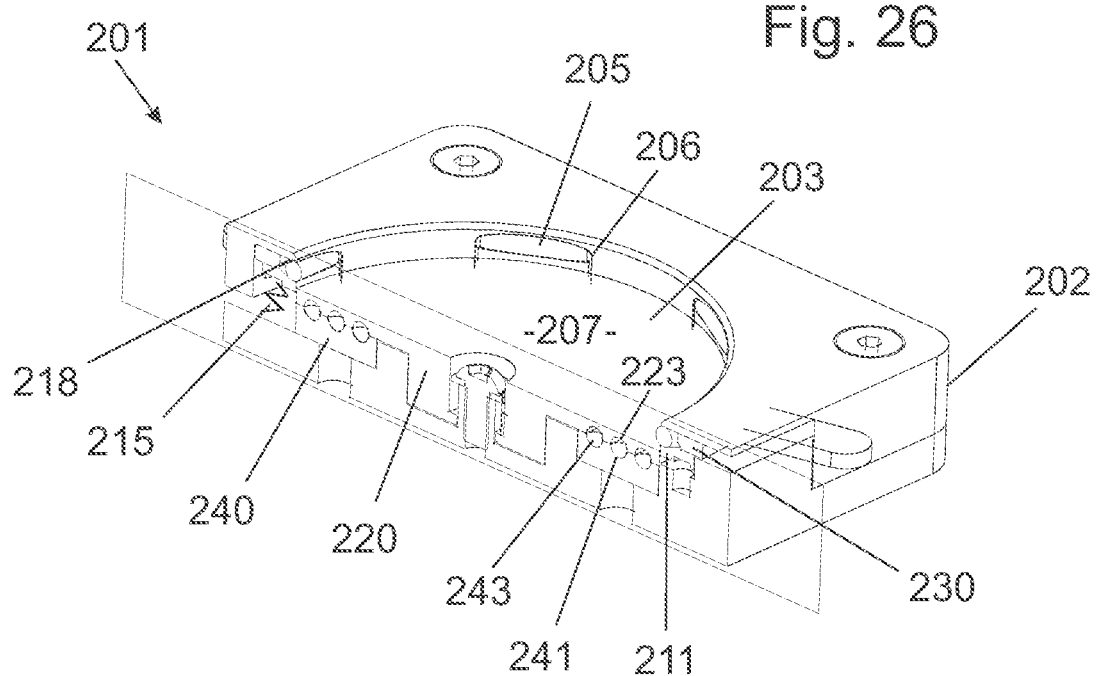
FIG. 27 is a cross sectional view of the quick release camera mount of FIG. 25.

Alternatively the latching members 206 may be cylindrical bearings as shown in FIGS. 26 and 27. This alternative embodiment operates in a similar manner, and accordingly like elements have been labelled with the same numerals.

Lock

To lock the circular camera plate 300 in the quick release camera mount 201, a lifting locking mechanism substantially as previously described can be used. The lifting locking mechanism best described with reference to FIG. 23. The camera mount 201 preferably comprises a locking controller 204, to operate the lifting locking mechanism.

As substantially described in relation to previous embodiments illustrated in FIGS. 8-12, the locking controller 204 rotates the lock ring 240 with ball bearings 243 to lift the locking plate 220. As the locking plate 220 is lifted, the camera plate 330 is lifted (forced upwards), and clamped against latching members 206. The locking plate 220 has a large surface area which engages with the circular camera plate 300 to provide a reliable stable surface suitable for large and heavy cameras (or other mounted objects).

The locking controller 204 moves the quick release camera mount 201 between a locked and unlocked condition. The locking controller 204 is attached to a lock ring 240 comprising a plurality of ramped ball tracks 241. Ball bearings 243 are constrained within the ramped (following a helical pathway) ball tracks 41 of the lock ring 240, separating the locking plate 220 above the lock ring 240. A plurality of ball bearings 43 provides a number of contact points to reduce friction and bear loads.

Preferably, the locking plate 220 comprises a plurality of ramped ball tracks 223 at the base of the locking plate complementary to the ramped ball track 241 of the lock ring 240.

Rotation of the lock ring 240 in a first direction lifts the locking plate 220 from a lower start height to a higher finish height. The ball bearings 243 move upwards in a helical movement as the lock ring 240 rotates. As the ball bearings 243 move upwards, the locking plate 220 is forced to lift upwards. As the locking plate 220 moves upwards, the camera plate 300 is also forced into a locked position where the locking plate 220 clamps the latching surface 205 of the camera plate 300 against the latching members 206 of the quick release camera mount 201.

To unlock the quick release camera mount 201 the locking controller 204 may then be rotated in a second direction to lower the locking plate 220 downwards so that the camera plate 300 disengages from the latching members 206.

To those skilled in the art to which the invention relates, many changes in construction and widely differing embodiments and applications of the invention will suggest themselves without departing from the scope of the invention as defined in the appended claims.

The invention claimed is:

1. A quick release mount system comprising:
a mounting plate having opposed sides, each including latching surfaces,
a base having a socket for receiving said mounting plate, and at least one movable latching member for engaging with one of said latching surfaces of said mounting plate to prevent separation of said mounting plate from said socket,
said mounting system further comprises a locking mechanism operating to push said mounting plate in a direction perpendicular to, and away from, said base against said at least one latching member, to rigidly clamp said mounting plate within said socket, and wherein said at least one movable latching member is free to rotate.

2. The quick release mount system as claimed in claim 1, wherein said base having a socket for receiving said mounting plate includes at least one movable latching member for engaging with each latching surface on opposed sides of said mounting plate.

3. The quick release mount system as claimed in claim 1, wherein there are a plurality of movable latching members for engaging with said latching surfaces.

4. The quick release mount system as claimed in claim 3, wherein said movable latching members are each located within a slot in a sidewall of said base, and are constrained to move only along a path with a single degree of translational freedom.

5. The quick release mounting system as claimed in claim 4, wherein said path is oriented obliquely with respect to a floor of said socket.

6. The quick release mounting system as claimed in claim 5, wherein said path is oriented obliquely with respect to the floor at:
a) between approximately 30° and approximately 60°, or
b) approximately 45°.

7. The quick release mounting system as claimed in claim 3, wherein
said locking mechanism comprises complimentary wedged members configured to translate with respect to each other, and thereby clamp said mounting plate against said latching members.

8. The quick release mounting system as claimed in claim 3 wherein
said locking mechanism comprises at least one threaded member, the rotation of which clamps said mounting plate against said latching members.

9. The quick release mounting system as claimed in claim 1, wherein said at least one movable latching member comprises:
a) ball bearings,
b) substantially cylindrical rollers, or
c) a combination of ball bearings and cylindrical rollers.

10. The quick release mounting system as claimed in claim 1, wherein said at least one latching member is biased into a latching position, such that said at least one latching member protrudes at least partially into said socket.

11. The quick release mount system as claimed in claim 1 wherein said opposed sides of said mounting plate include oblique latching surfaces such that a base of said mounting plate is wider than a top of said mounting plate.

12. The quick release mounting system as claimed in claim 3, wherein a release mechanism is provided for disengaging at least all the movable latching members along one side of said socket, from said latching surfaces of said mounting plate.

13. The quick release mounting system as claimed in claim 12, wherein said release mechanism translates said latching members in a straight linear path.

14. A quick release mount system comprising:
a mounting plate including at least one latching surface,
a base having a socket for receiving said mounting plate, and at least one movable latching member for engaging with said at least one latching surfaces of said mounting plate to prevent separation of said mounting plate from said socket,
said mounting system further comprises a locking mechanism operating to push said mounting plate in a direction perpendicular to, and away from, said base against said at least one latching member, to rigidly clamp said mounting plate within said socket wherein said locking mechanism comprises:
a locking plate located in a floor of said socket, and including on an underside thereof a plurality of locking plate ball tracks defining a helical path,
a locking ring located under said locking plate, and including on an upper side thereof a plurality of locking ring ball tracks defining helical paths to complement said locking plate ball tracks, and
a plurality of ball bearings, each located within corresponding locking plate and locking ring ball tracks, and
wherein rotation of said locking ring with respect to said locking plate causes the ball bearings to separate the locking ring from the locking plate to thereby clamp said mounting plate between said locking plate and said at least one latching member.

15. The quick release mounting system as claimed in claim 14, wherein there are between 3 and 6 corresponding sets of ball bearings and ball tracks.

16. A quick release mounting system comprising:
a mounting plate including at least one latching surface,
a base having a socket for receiving said mounting plate, and at least one movable latching member for engaging with a said at least one latching surface of said mounting plate to prevent separation of said mounting plate from said socket,
said mounting system further comprises a locking mechanism operating to push said mounting plate in a direction perpendicular to, and away from, said base against said at least one latching member, in order to rigidly clamp said mounting plate within said socket, and wherein said at least one movable latching member is free to rotate.

* * * * *